United States Patent [19]

Zompolas et al.

[11] Patent Number: 4,676,454
[45] Date of Patent: Jun. 30, 1987

[54] BACKUP PUMP FOR AIRCRAFT INSTRUMENT SYSTEM INCLUDING HEATER

[76] Inventors: Thomas Zompolas; Nicholas Zompolas, both of 7702 Geralayne Dr., Milwaukee, Wis. 53213

[21] Appl. No.: 798,402

[22] Filed: Nov. 15, 1985

Related U.S. Application Data

[63] Continuation-in-part of Ser. No. 609,434, May 11, 1984, abandoned.

[30] Foreign Application Priority Data

May 11, 1985 [CA] Canada .................................. 479484

[51] Int. Cl.$^4$ ............................................. B64D 47/00
[52] U.S. Cl. .................................. 244/1 R; 60/39.093; 137/341; 303/1
[58] Field of Search .......................... 244/1 R, 134 R; 60/39.093; 137/341, 340, 339; 418/83; 415/177; 417/368, 313, 572, 3; 138/32, 33; 303/1; 73/178 R

[56] References Cited

U.S. PATENT DOCUMENTS

| | | | |
|---|---|---|---|
| 2,228,315 | 1/1941 | Hutton | 137/341 |
| 2,655,308 | 10/1953 | Luttman | 60/39.093 |
| 2,704,085 | 3/1955 | Bieger et al. | 137/341 |
| 2,978,169 | 4/1961 | Stanton | 60/39.093 |
| 2,979,074 | 4/1961 | Yanda | 303/1 |
| 4,364,268 | 12/1982 | Zompolas | 73/178 R |

*Primary Examiner*—Galen Barefoot

[57] ABSTRACT

A pump system for use with an air operated instrument system of an aircraft. A primary pump is connected to an air operated instrument and a backup pump is provided in the event of failure of the primary pump. Heated air from the discharge port of the primary pump is used to heat the backup pump during operation of the primary pump.

9 Claims, 5 Drawing Figures

BACKUP PUMP FOR AIRCRAFT INSTRUMENT SYSTEM INCLUDING HEATER

RELATED APPLICATIONS

This application is a continuation-in-part application of applicant's U.S. patent application Ser. No. 609,434, filed May 11, 1984 and Titled Backup Vacuum Pump for Aircraft Including Heater, now abandoned.

FIELD OF THE INVENTION

The present invention is directed to aircraft instruments and to apparatus for providing a backup power source for operating instruments in small light aircraft.

BACKGROUND PRIOR ART

In single engine light aircraft, it is common that a number of the instruments are vacuum or air pressure operated. These instruments include the heading indicator, attitude indicator and turn and bank indicator. Applicant's U.S. Pat. No. 4,364,268, issued Dec. 21, 1982 is directed to apparatus for providing a redundant vacuum or air pressure source to provide for continued operation of the instruments in the event there is a failure of the primary pump. Such apparatus for providing a backup vacuum or air pressure source includes a second pump connected to the instruments in such a manner that it becomes operable in response to failure of the primary pump. In normal practice the back-up pump is mounted in the engine compartment of the airplane forward of the fire wall.

Air pumps of the type commonly employed as vacuum or air pressure pumps used to operate aircraft instruments commonly comprise impeller type pumps having an aluminum housing and a carbon impeller. The pump is constructed such that the planar end faces of the impeller are very closely spaced with respect to opposed planar faces of the aluminum housing. The aluminum forming the housing has a coefficient of expansion of 0.00124 inch per 100° F. The carbon material commonly used in the construction of an impeller commonly has a coefficient of expansion of 0.00025 inch per 100° F. Because of the differences in the rates of expansion of these materials, if the pumps are placed in a very cold environment, for example, −40° C., the aluminum housing may contract sufficiently that the impeller will be immovable and the pump inoperable.

When an airplane is operated at high altitudes, the ambient temperature may be −40° C. or colder, and it is possible that the secondary pump for the aircraft instruments may become so cold that the pump will become inoperable.

Additionally, in the operation of vacuum operated instrument systems, when the backup pump is placed in operation, it draws air through the instruments being operated. These instruments are within the aircraft cabin, and the air flowing through the backup vacuum pump will be heated cabin air. At high altitudes or in very cold climates, this heated cabin air has a higher moisture content than the outside air. In the event the backup pump is at high altitude when it is called on, when the cabin air having high moisture content is pulled through the pump, the moisture may freeze on the interior surfaces of the pump and cause failure of the backup pump.

SUMMARY OF THE INVENTION

The present invention provides an improved backup pump system and more specifically includes means for heating the backup pump during operation of the primary pump such that the backup pump will be operational even if the backup pump is first called on at high altitude or otherwise in a very cold environment.

More specifically, the invention includes an instrument system for an aircraft and comprises a primary pump operably connected to the aircraft engine so as to be driven by the aircraft engine, means for operably connecting at least one air operated aircraft instrument to the primary pump, a backup pump, and an electric motor operably connected to the backup pump for selectively driving the backup pump if the primary pump fails. The backup system also includes means for selectively operably connecting the backup pump to the instrument if the primary pump fails, means for connecting the electrical motor to the electrical power-source, and means for heating the backup pump during operation of the primary pump. The means for heating the backup pump functions to maintain the temperature of the backup pump above the temperature where the backup pump will be inoperable.

The invention also includes a backup system for use in an aircraft and adapted to be used in combination with a primary pump operably connected to instruments of the aircraft, and where the primary pump includes a first port adapted to be connected to the instruments of the aircraft, and a second port. The backup system includes a backup pump having a first port adapted to be selectively connected to the instruments of the aircraft when the primary pump fails, an electrical motor operably connected to the backup pump for selectively driving the backup pump when the first port of the backup pump is connected to the instruments of the aircraft, the electrical motor being adapted to be connected to an electrical power source of the aircraft. The backup system also includes means for heating the backup pump during operation of the primary pump, the means for heating maintaining the temperature of the backup pump above the temperature where moisture will freeze in the backup pump.

In one embodiment of the invention the primary pump comprises a vacuum pump having an inlet opening connected to a vacuum operated instrument and a discharge outlet, and the means for heating the backup pump comprises a jacket surrounding the backup pump, and means are provided for conducting air from the discharge port of the primary vacuum pump into the jacket.

In one embodiment of the invention the jacket includes an interior wall surrounding the backup pump and spaced outwardly from the pump to define an air space therebetween, and the means for conducting air connects the discharge outlet of the primary vacuum pump to the air chamber.

Various other features and advantages of the invention will be apparent by reference to the following description of a preferred embodiment of the invention, from the drawings, and from the claims.

Figure 1:
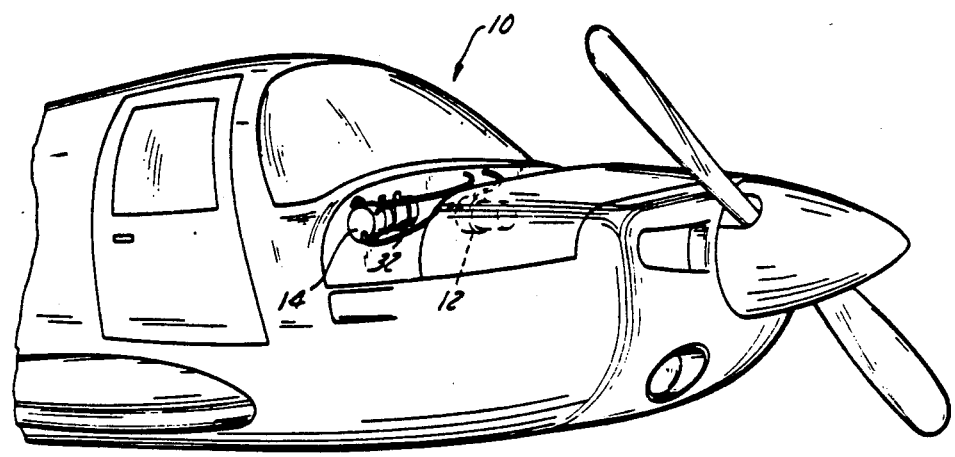
FIG. 1 is a perspective view of a redundant vacuum pump system embodying the present invention mounted in an aircraft and where the instrument system is vacuum operated.

Before describing a preferred embodiment of the invention in detail, it is to be understood that the invention is not limited in its application to the detailed construction and to the arrangements set forth in the following description nor illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 2:
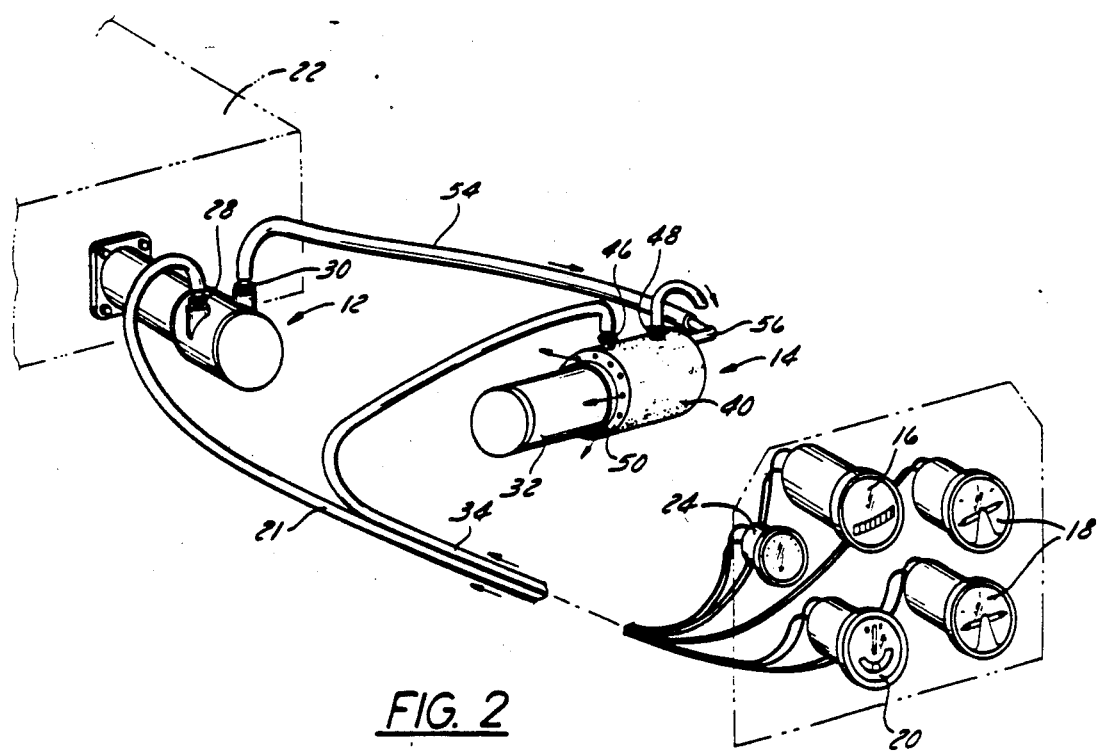
FIG. 2 is a schematic view of the redundant vacuum pump system shown in FIG. 1.
Figure 4:
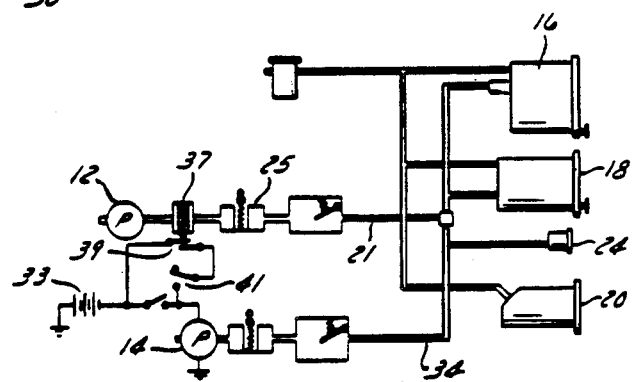
FIG. 4 is a schematic view of apparatus embodying the invention.

FIG. 1 shows a small light aircraft 10 including apparatus embodying the invention and including a primary pump 12 and a backup pump 14. Illustrated in FIG. 2 is an aircraft instrument system including a plurality of vacuum operated instruments of the type commonly employed in such small aircraft as shown in FIG. 1. These instruments include a heading indicator 16, attitude indicator 18, and a turn and bank indicator 20. The instruments 16, 18 and 20 are conventional and their operation will not be described in detail. The instruments 16, 18 and 20 are connected in a conventional manner by a vacuum line 21 to the primary vacuum pump 12. The primary vacuum pump 12 is also conventional and is adapted to be driven by the aircraft engine 22. In a preferred form of the invention the heading indicator 16, attitude indicator 18, and turn and bank indicator 20 are mounted within the airplane cabin. Also included is a vacuum gauge 24 also connected to the vacuum line 21. The primary vacuum system described above can also include a conventional suction relief valve 25 (FIG. 4) connected to the vacuum line 21 and functional to prevent vacuum in that line in excess of 5 inches of mercury.

While the primary vacuum pump is conventional and will not be described in detail, generally it includes a housing containing a conventional rotary impeller operably connected to the engine 22 so as to be rotationally driven by the engine. The pump 12 includes an inlet port 28 adapted to be connected to the vacuum line 21 and a discharge port 30. In operation of the pump 12, air is drawn through the vacuum line 21 into pump 12 and discharged through the discharge port 30.

Means are also included for providing a redundant or backup vacuum source in the event of failure of the primary vacuum pump 12 and for maintaining operation of the instruments 16, 18 and 20 despite such a failure of the primary pump 12 or, failure of the aircraft engine 22. In a preferred form of the invention the backup vacuum source will comprise a backup vacuum pump 14 having the same construction as the primary vacuum pump 12 and being driven by an electric motor 32 adapted to be selectively connected to the battery 33 of the airplane. The backup vacuum pump 14 is connected to the vacuum operated instruments by a vacuum line 34 and is also adapted to generate a vacuum of at least 4 inches of mercury.

The primary vacuum pump 12 and the backup vacuum pump 14 are connected to the vacuum operated instruments 16, 18 and 20 in the manner described in applicant's U.S. Pat. No. 4,364,268 and the disclosure of that patent is incorporated herein by reference. As described in that patent the means for causing actuation of the backup vacuum pump 14 can include means for causing electrical connection of the motor 32 driving backup vacuum pump 14 with the airplane battery 33 in the event of a failure of the primary pump 12 causing a drop in the vacuum in vacuum line 21 below a predetermined level. As described in applicant's U.S. Pat. No. 4,364,268, this means for causing selective electrical connection can include a vacuum responsive switch 37 connected to the vacuum line 21. The vacuum responsive switch 37 includes normally open switch contacts 39 and means for sensing a decrease in the vacuum in the vacuum line 21. The vacuum responsive switch 37 also includes means for closing the switch contacts in response to an undue decrease in vacuum in the vacuum line 21. The circuit also includes a manually armed switch 41 to be closed by the pilot once the engine is started and the primary vacuum pump 12 begins to operate. During normal operation of the aircraft, the motor 32 driving backup vacuum pump 14 is disconnected from the battery 33 and does not operate. In the event that the primary vacuum pump 12 fails or the aircraft engine 22 fails, thereby causing a decrease in the vacuum in vacuum line 21, the pressure responsive switch 37 will cause the electric motor 32 driving the backup vacuum pump 14 to be actuated. The backup vacuum pump 14 will then provide vacuum to operate the instruments 16, 18 and 20. Means are also provided for heating the backup vacuum pump 14 during operation of the primary vacuum pump so as to prevent the backup vacuum pump 14 from being inoperable in the event the backup pump is called into service when the plane is at high altitude or is otherwise in cold atmospheric conditions. When the airplane is at high altitude, the backup pump 14, mounted in the engine compartment, may be subjected to very cold temperatures. If the pump becomes sufficiently cold, thermal contraction of some of the components of the pump may prevent the pump from operating. Additionally, during operation of the primary pump 12, the air being drawn by that pump is pulled from the aircraft cabin through the vacuum operated instruments 16, 18 and 20. At high altitudes the air in the aircraft cabin will be much warmer and have a substantially higher moisture content than the atmospheric air surrounding the primary and backup pumps. If the backup pump 14 is called into service at such cold temperatures, it will draw warm, relatively moist air from the aircraft cabin. When this moist air moves into the pump 14, if the pump surfaces are cold, the moisture will freeze on the pump surfaces causing the pump 14 to fail.

Figure 3:
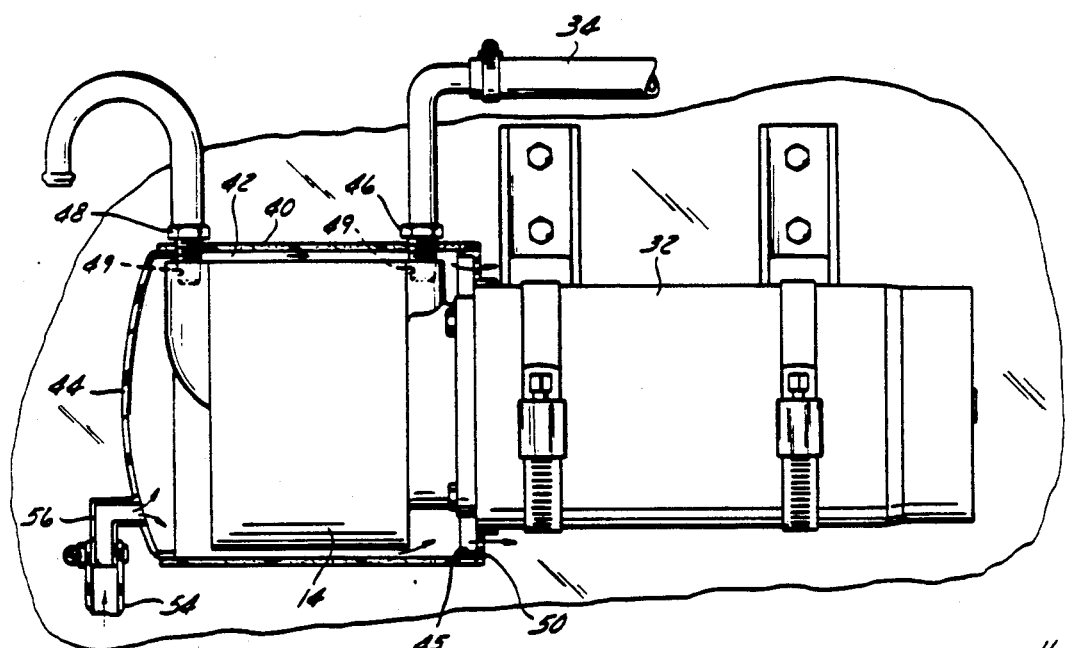
FIG. 3 is an enlarged side elevation view of a backup vacuum pump shown in FIGS. 1 and 2 and with portions cut away.

In the illustrated construction, the means for heating the backup vacuum pump 14 during operation of the primary pump includes a shroud or jacket 40 adapted to surround the backup pump 14 and to provide an air space 42 (FIG. 3) around the vacuum pump 14. The jacket 40 is cylindrical and includes a closed end 44. The jacket 40 also includes an open end 45. In assembly of the backup vacuum pump 14 illustrated in the drawings, the inlet port coupling 46 and outlet port coupling 48 are threadably removed from the pump ports and the open end 45 of the jacket 40 can be slipped over the pump 14. The jacket 40 can slide onto the pump until the pump is completely housed within the cylinder defined by the jacket. The couplings 46 and 48 are then reinserted through openings 49 into the threaded ports of the pump 14. A spacer 50 is inserted into the open end 45 of the jacket 40 and surrounds the pump to maintain spacing between the cylindrical wall of the jacket 40 and the pump 14. While the spacer 50 could comprise other means for supporting the open end 45 of the jacket with respect to the pump 14, in the illustrated construction it comprises a ring surrounding a portion of the electric motor 32. The discharge port 30 of the primary pump 12 is connected by a tube 54 and a coupling 56 to the jacket 40. During operation of the primary pump 12, the air flow through the pump 12 and discharged through the outlet port 30 is compressed by the pump. This compression of the air flowing through the pump 12 causes the air to be heated, and the compressed air from the discharge port 30 of a conventional aircraft vacuum pump 12 may be exhausted at 160° to 200° F. By conveying this relatively warm air into the jacket 40 surrounding the backup vacuum pump 14, during the operation of the primary pump 12, the backup pump 14 is kept warm.

In the event that the primary pump 12 fails, the backup pump 14 will be sufficiently warm that the moisture in the air from the aircraft cabin will not freeze in the pump 14. Once the backup pump 14 begins to function, the relatively warm air flowing through the pump and the heat generated by compression of air in the backup pump will maintain the backup pump at a sufficiently elevated temperature that it will continue to operate.

While the shroud or jacket 40 could be constructed of other materials, in one preferred form of the invention the jacket 40 can be comprised of a foam material such as expanded polyurethane foam having a wall thickness of from ¼" to ½".

Figure 5:
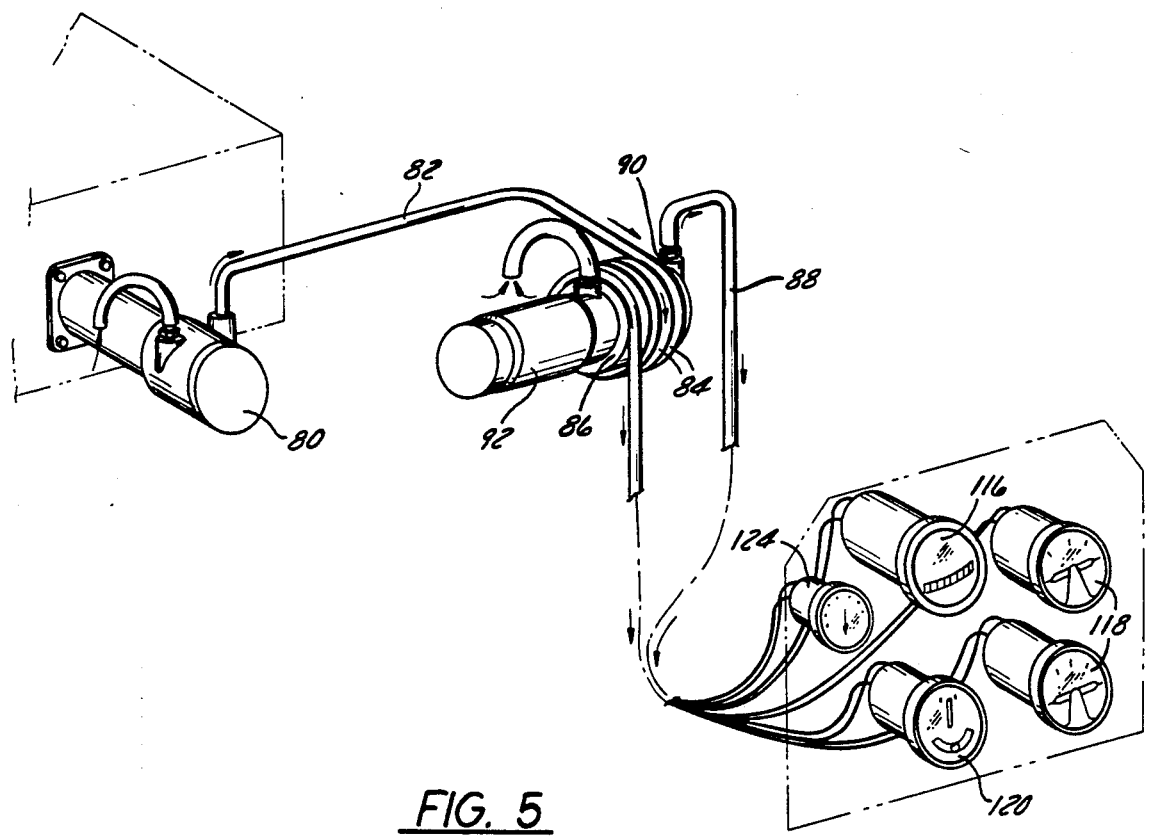
FIG. 5 is an illustration similar to FIG. 2 and showing an air pressure operated aircraft instrument system and a redundant air pressure pump system for supplying air pressure to the instrument system.

Illustrated in FIG. 5 is an alternative embodiment of a redundant pump system for operating an aircraft instrument system. The aircraft instrument system illustrated in FIG. 5 includes an air pressure operated instrument system of the type described in applicant's U.S. Pat. No. 4,364,268. A primary air pressure pump 80 is operably connected to pressure operated aircraft instruments 116, 118, 120 and 124 by an air conduit 82. The air conduit 82 comprises an elongated tube including a plurality of coils 84 surrounding a backup or secondary air pressure pump 86 of a backup air pressure system. A tube 88 operably connects the output port 90 of the secondary air pressure pump 86 to the instruments in the event the primary pump fails. An electric motor 92 is also provided for selectively driving the secondary air pressure pump 86. The compressed output air from the primary air pump 80 will be discharged from the primary pump at a temperature of 160° F. to 200° F. This heated air is conveyed through the coils 84 and thereby heats the secondary pump 86 before being conveyed to the instruments. The secondary pump 86 is thus heated sufficiently during operation of the primary pump 80 that in the event the primary pump 80 fails, the secondary pump 86 will be operational.

Various features of the invention are set forth in the following claims.

We claim:

1. A vacuum system for use in a vacuum operated instrument system of an aircraft, the aircraft including an engine, an electrical power source and at least one vacuum operated instrument, the vacuum system comprising:
   a primary vacuum pump operably connected to the aircraft engine so as to be driven by the aircraft engine, said primary pump including an air inlet port and an air outlet port,
   means for operably connecting the vacuum operated instrument to the primary vacuum pump,
   a backup vacuum pump,
   an electrical motor operably connected to the backup vacuum pump for selectively driving the backup vacuum pump if the primary pump fails,
   means for selectively operably connecting the backup vacuum pump to the instrument if the primary vacuum pump fails,
   means for connecting the electrical motor to the electrical power source, and
   means for heating the backup vacuum pump during operation of the primary vacuum pump, said means for heating including a conduit from said air outlet port of said primary vacuum pump to said backup pump whereby heated air discharged through said air outlet port will be conveyed to said backup pump to heat said backup pump.

2. A backup vacuum system for use in an aircraft and adapted to be used in combination with a primary vacuum pump operably connected to vacuum operated instruments of the aircraft, the primary vacuum pump including an inlet adapted to be connected to the vacuum operated instruments of the aircraft, and an outlet port for discharging air from the pump, the backup vacuum system comprising:
   a backup vacuum pump including an inlet port adapted to be selectively connected to the vacuum operated instruments of the aircraft if the primary vacuum pump fails,
   an electrical motor operably connected to the backup vacuum pump for selectively driving the backup vacuum pump when the inlet port of the backup pump is connected to the vacuum operated instruments of the aircraft, the electrical motor being adapted to be connected to an electrical power source of the aircraft, and
   means for heating the backup vacuum pump during operation of the primary vacuum pump, the means for heating maintaining the temperature of the backup vacuum pump above the temperature where moisture will freeze in the backup vacuum pump, said means for heating including a conduit from said air outlet port to said backup pump whereby heated air discharged through said air outlet port will be conveyed to said backup pump to heat said backup pump.

3. A vacuum system for use in a vacuum operated instrument system of an aircraft, the aircraft including an engine, an electrical power source and at least one vacuum operated instrument, the vacuum system comprising:
   a primary vacuum pump operably connected to the aircraft engine so as to be driven by the aircraft engine, and including an inlet opening connected to the vacuum operated instrument, and a discharge outlet,
   means for operably connecting the vacuum operated instrument to the primary vacuum pump,
   a backup vacuum pump, an electrical motor operably connected to the backup vacuum pump for selectively driving the backup vacuum pump if the primary pump fails, means for selectively operably connecting the backup vacuum pump to the instrument if the primary pump fails, means for connecting the electrical motor to the electrical power source, and means for heating the backup vacuum pump during operation of the primary vacuum pump, the means for heating maintaining the temperature of the backup vacuum pump above the temperature where moisture will freeze in the backup pump, said means for heating including a jacket surrounding the backup vacuum pump and means for conducting air from the discharge port of the primary vacuum pump into the jacket.

4. Apparatus as set forth in claim 3 wherein the jacket includes an interior wall surrounding the backup vacuum pump and spaced outwardly from the pump to define an air chamber therebetween and wherein the means for conducting air connects the discharge outlet of the primary vacuum pump to the air chamber.

5. A backup vacuum system for use in an aircraft and adapted to be used in combination with a primary vacuum pump operably connected to vacuum operated instruments of the aircraft, the primary vacuum pump including an inlet adapted to be connected to the vacuum operated instruments of the aircraft, and an outlet port for discharging air from the pump, the backup vacuum system comprising:

a backup vacuum pump including an inlet port adapted to be selectively connected to the vacuum operated instruments of the aircraft when the primary vacuum pump fails, an electrical motor operably connected to the backup vacuum pump for selectively driving the backup vacuum pump when the inlet port of the backup pump is connected to the vacuum operated instruments of the aircraft, the electrical motor being adapted to be connected to an electrical power source of the aircraft, and means for heating the backup vacuum pump during operation of the primary vacuum pump, the means for heating maintaining the temperature of the backup vacuum pump above the temperature where moisture will freeze in the backup pump, said means for heating the backup vacuum pump including a jacket surrounding the backup vacuum pump and means for conducting air from the discharge port of the primary vacuum pump into the jacket.

6. Apparatus as set forth in claim 5 wherein the jacket includes an interior wall surrounding the backup vacuum pump and spaced outwardly from the pump to define an air chamber therebetween and wherein the means for conducting air connects the discharge outlet of the primary vacuum pump to the air chamber.

7. A pump system for use in an air operated instrument system of an aircraft, the aircraft including an engine, an electrical power source and at least one air operated instrument, the pump system comprising:

a primary pump, said primary pump including an air inlet port and an air outlet port, means for operably connecting the air operated instrument to the primary pump, a backup pump, means operably connected to the backup pump for selectively driving the backup pump when the primary pump fails, means for selectively operably connecting the backup pump to the instrument when the primary pump fails, and means for heating the backup pump during operation of the primary pump, the means for heating maintaining the temperature of the backup pump above the temperature where the backup pump will be inoperable, said means for heating including a conduit from said air outlet port to said backup pump whereby heated air discharged through said air outlet port will be conveyed to said backup pump to heat said backup pump.

8. A pump system as set forth in claim 7 wherein the means for heating the backup pump includes a coil defined by said conduit, said coil surrounding at least a portion of said backup pump whereby heated air from said air outlet port and passing through said conduit heats said backup pump.

9. A pump system as set forth in claim 7 wherein said means for heating the backup pump includes a portion of said conduit surrounding at least a portion of said backup pump, whereby heated air from said air outlet port and passing through said conduit heats said backup pump.

* * * * *